UNITED STATES PATENT OFFICE.

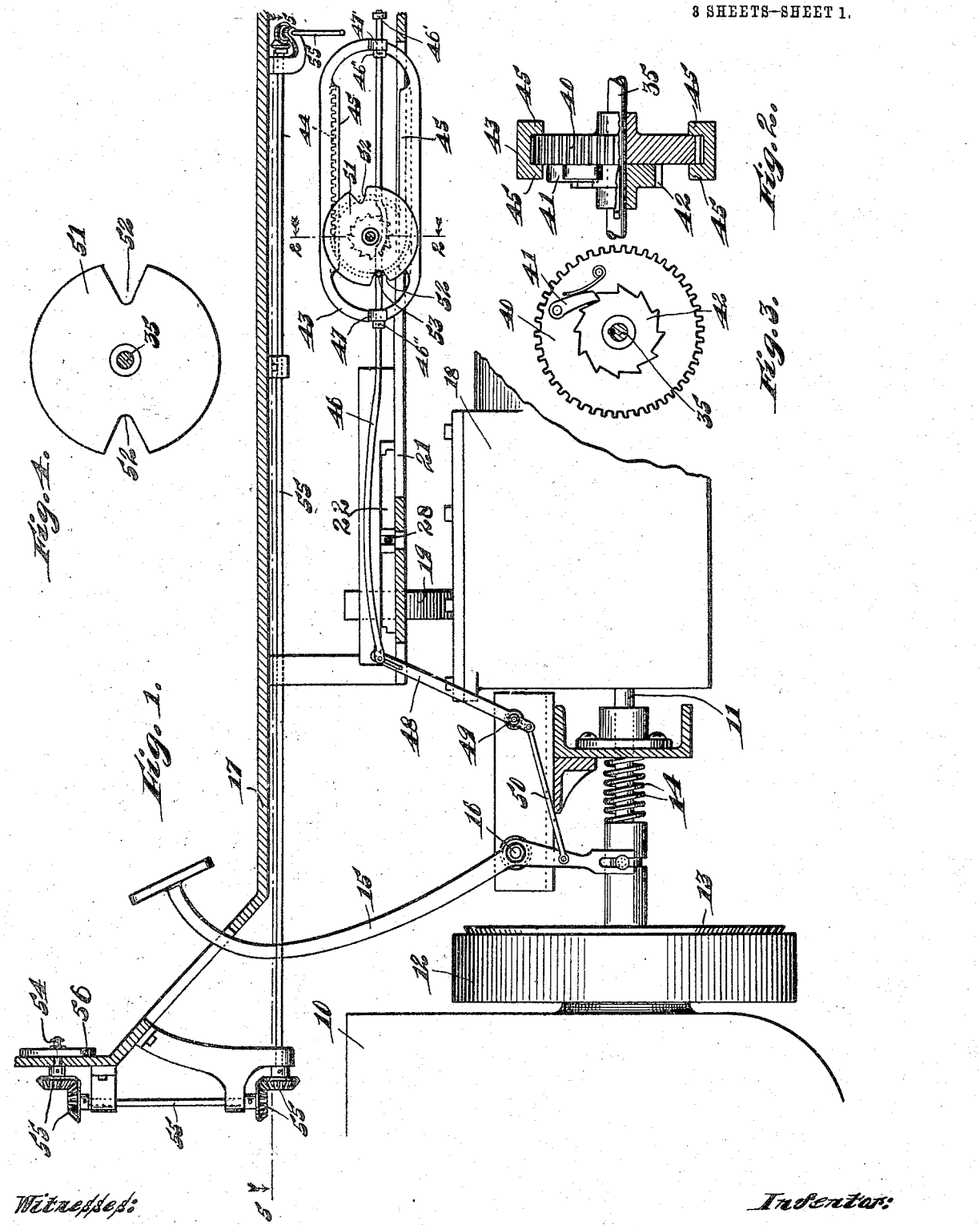

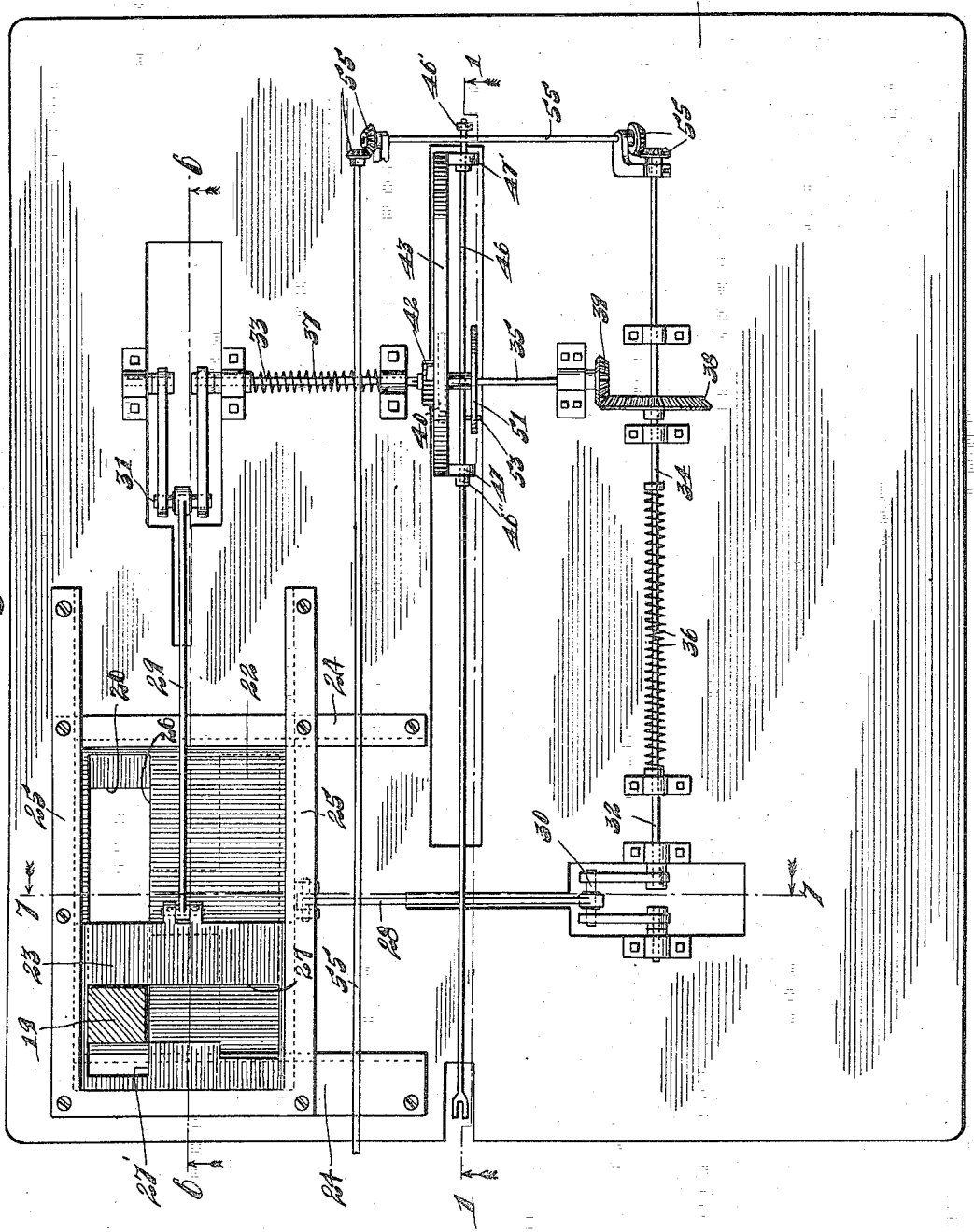

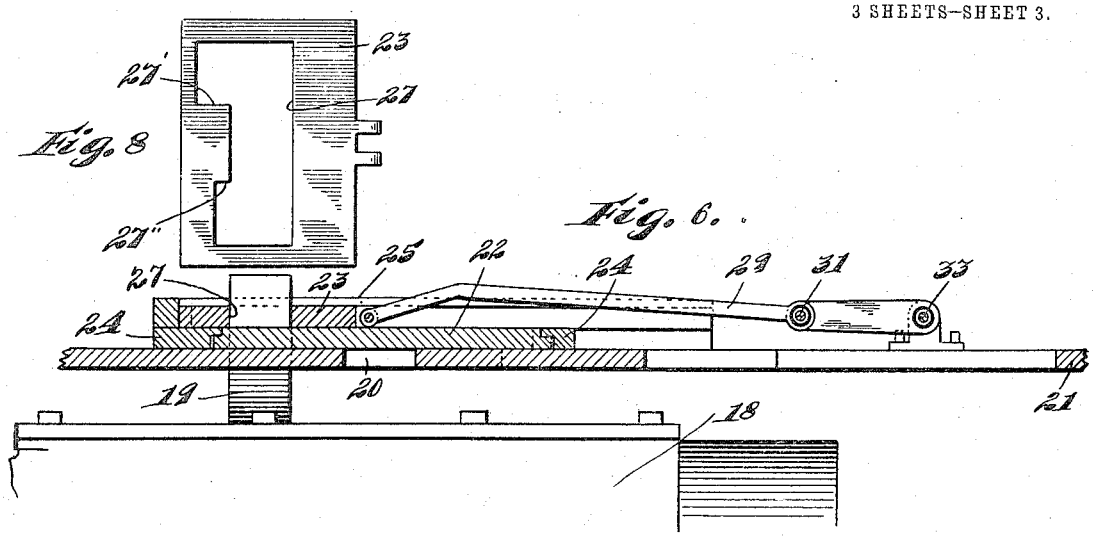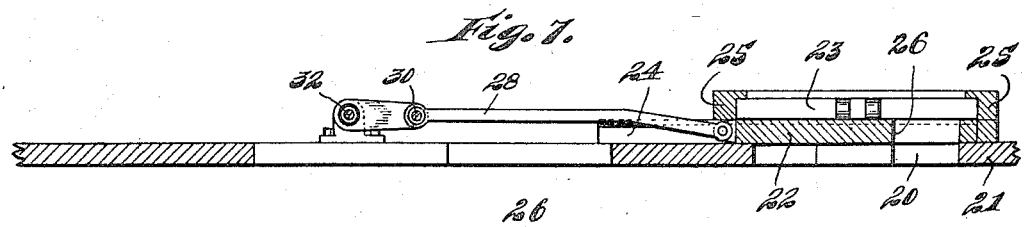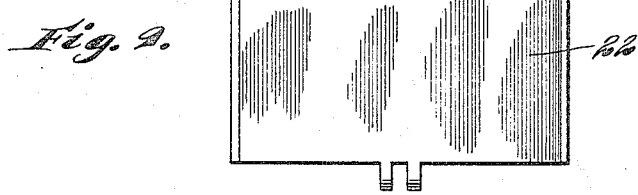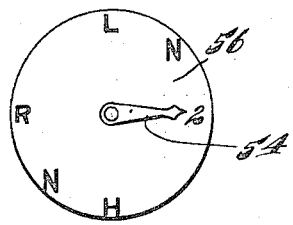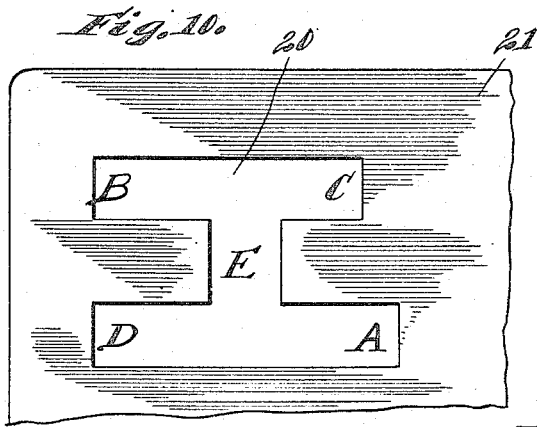

STEWART K. MONTGOMERY, OF CULLOM, ILLINOIS.

GEAR-SHIFTING MECHANISM.

1,127,664.     Specification of Letters Patent.     Patented Feb. 9, 1915.

Application filed May 4, 1914. Serial No. 836,195.

*To all whom it may concern:*

Be it known that I, STEWART K. MONTGOMERY, a citizen of the United States, and a resident of the city of Cullom, county of Livingston, and State of Illinois, have invented certain new and useful Improvements in Gear-Shifting Mechanism, of which the following is a specification.

My invention relates to gear shifting mechanism and has for its object the production of a gear shifting mechanism designed for use especially upon motor cars or automobiles which will be of durable construction and through the medium of which the shifting of the transmission gears of the vehicle may be effected easily and expeditiously.

Other objects will appear hereinafter.

The invention consists in the combinations and arrangements of parts hereinafter described and claimed.

The invention will be best understood by reference to the accompanying drawings forming a part of this specification, and in which, Figure 1 is a fragmental section of an automobile or motor vehicle equipped with a gear shifting mechanism embodying my invention, said section being taken on substantially line 1—1 of Fig. 5, Fig. 2 is an enlarged detail section taken on substantially line 2—2 of Fig. 1, the slotted disk shown in Fig. 1 being omitted, Fig. 3 is a side elevation of Fig. 2, Fig. 4 is an enlarged detail of a notched disk included in the construction, shown in Fig. 1, Fig. 5 is an enlarged section taken on substantially line 5—5 of Fig. 1, Figs. 6 and 7 are sections taken on lines 6—6 and 7—7 respectively of Fig. 5, Figs. 8 and 9 are top plan views of slotted plates included in the construction, Fig. 10 is a top plan view of a fragment of the stationary main or body plate of the mechanism showing the form of the slot provided therein for engagement with the actuating stem of the gears in connection with which the mechanism is employed, and Fig. 11 is a detail of the indicator used in connection with the shifting mechanism.

The preferred form of construction as illustrated in the drawings is employed in conjunction with a motor car or automobile equipped with a clutch for connecting the power shaft of the engine or motor 10 of the vehicle with the driving shaft 11 thereof. This clutch, as illustrated in the drawings comprises a stationary clutch member 12 which is fixed to the power shaft and a movable clutch member 13 which is splined to the driving shaft 11. A helical compression spring 14 coöperates with the clutch member 13 to normally hold the same in engagement with the clutch member 12. Movement of the clutch member 13 to inoperative or disengaging position is effected by means of a depressible foot operable lever 15 which is fulcrumed at 16, the lower end of said lever engaging with said clutch member 13, as shown, so that upon depression of said lever, said clutch member will be moved to inoperative or disengaging position. The lever 15 projects upwardly through the floor 17 of the body of the vehicle so as to be adapted to be readily engaged by the foot of the driver, as is usual.

The transmission gears coöperating with the shaft 11 are of the ordinary type, being inclosed in a housing 18. Shifting of said gears in order to secure the desired speeds or reverse movement of the vehicle, is effected by means of an upwardly projecting pivoted stem 19.

The construction and arrangement of the transmission gears and the connection of the actuating stem 19 therewith as well as the mounting of the latter are old and well known and no claim to the specific details thereof is here made. The subject matter of the present case is embodied solely in mechanism described in the following for moving the stem 19 to its various positions of gear shifting.

The upper end of stem 19 passes through a substantially H-shaped slot 20 formed in a rigidly supported substantially horizontally disposed plate 21 which is arranged directly above transmission gear housing 18. The arrangement is such that, when the stem 19 is located at A in slot 20, as shown in Fig. 10, the transmission gears will be at low speed; when said stem is positioned in said slot at B, the transmission gears will be in second speed; when said stem is located at C, the transmission gears will be in third or high speed; when said stem is located at D, the transmission gears will be in reverse position; and when said stem is located at E, the transmission gears will be in neutral position. It is the function therefore of the remaining construction to move the stem 19 in the slot 20 to the various positions designated in the latter, in order to secure the various speeds, or reverse movement of the vehicle, as desired. The mechanism for accomplishing this movement of stem 19 in guiding slot 20 comprises a pair of superimposed plates 22 and 23 arranged at the upper side of plate 21 directly over the slot 20. The plate 22 is slidably mounted between guides 24 whereas the plate 23 is slidably mounted between guides 25, the directions of sliding movement permitted said plates being at right angles to each other, as clearly shown in Fig. 5. Said plates 22 and 23 are provided with elongated slots 26 and 27 respectively through which the stem 19 projects, as clearly shown in the several views. The slot 26 is disposed longitudinally of the slot 20, being of a length corresponding with the greatest dimension or length of said slot 20, whereas the slot 27 is disposed transversely of the slot 20, that is at right angles to the slot 26, being of a length corresponding with the narrowest dimension or width of said slot 20. Said plates 22 and 23 are moved relatively to each other by means of links 28 and 29 connected respectively therewith, the outer ends of said links being connected with cranks 30 and 31 respectively of crank shafts 32 and 33. The shafts 32 and 33 are mounted in suitable bearings provided upon the plate 21, and the latter is suitably slotted to afford a clearance for the cranks 30 and 31, and links 28 and 29, in the rotation of said cranks.

Arranged coaxial with the shafts 32 and 33 are operating shafts 34 and 35 suitably mounted in bearings provided on the plate 21, as shown. The shafts 32 and 34, and 33 and 35 are operatively connected by helical torsional springs 36 and 37 respectively, whereby a yielding connection between said shafts is established, as will be readily understood. The adjacent ends of shafts 34 and 35 are operatively connected by meshing bevel gears 38 and 39 provided respectively upon said shafts. The gears 38 and 39 bear the ratio of two to one so that in the rotation of said shafts, the shaft 35 will be rotated twice as fast as shaft 34.

Operation or rotation of the shaft 35 is effected by means of a gear 40 mounted upon shaft 35 and connected therewith by means of a spring pressed pawl 41, provided upon one side of said gear, which engages with a ratchet wheel 42 fixed to said shaft. The arrangement is such, as will be observed, that operative connection between said shaft and gear is effected only during rotation of the latter in one direction. Coöperating with said gear is an elongated loop-formed member 43 the inner side of the upper portion of which is formed with a rack 44 which meshes with said gear. Inwardly extending elongated flanges 45 turned inwardly from opposite sides of the member 43, engage against opposite sides of gear 40, serving to maintain the latter constantly in mesh with the rack 43, as will be readily understood. In the event of the member 43 being formed of cast metal, one of the flanges 45 will be removably secured in position so as to permit of assembling, but in the event of said member being formed of malleable metal, the fourth flange 45 may be bent into position after the member 43 has been arranged in operative position upon the gear 40.

Longitudinal movement of the member 43 is effected by means of a rod 46, which slidably engages in guide lugs 47 and 47' provided at one side of said member 43. A stop or head 46', provided at the rearward end of rod 46, is adapted to engage against the lug 47' in the forward movement of the rod 46 in order to impart corresponding movement to said member 43. In the rearward movement of the rod 46, stop collars 46'' engage against said lugs 47 and 47' in order to carry the member 43 rearwardly. The arrangement is such, as will be seen, that slight lost motion of the rod 46 is permitted for a purpose which will be pointed out in the following. The forward end of rod 46 is connected with the upper end of a rocker arm 48 which is fulcrumed at 49, the lower end of said rocker arm being connected by means of a link 50 with the lower end of lever 15. The arrangement is such, as will be observed, that an operative connection is established between the lever 15 and the rack 43, the parts being so arranged in proportion, that upon depression of said lever, the gear 40 and hence the shaft 35, will be turned by the rack 44 through exactly one hundred and eighty degrees.

With the construction described, upon rotation of the shaft 35 and hence the shaft 34 through depression of the lever 15, with the stem 19 in position B in slot 20, as clearly shown in Fig. 5, the plate 23 will be moved rearwardly, or toward the right, as shown in Fig. 5, carrying the stem 19 toward the position C in said slot. Said stem 19 is prevented from entering the portion E of slot 20 in the movement of said stem to the position C by a stop shoulder 27', as clearly shown in Figs. 5 and 8. The stem 19 being prevented from moving through the portion E of slot 20, or to the left, the shaft 32 is held against rotation so that during the rotation of shaft 34, the torsional spring 36 will be placed in tension. Upon the next depression of the lever 15, the crank 31 will move forwardly carrying the plate 23 and hence the stem 19 in a corresponding direction. As the stem 19 reaches a position in registration with the slot portion E, the tension of spring 36 which has been constantly increasing during the rotation of shafts 34 and 35 will, through the plate 22, exert its pressure upon said stem and cause the latter to be moved through said slot portion E, or toward the left into the other main portion of the slot 20. As said stem passes out of engagement or registration with the slot portion E, the same will be carried by the plate 23 to the position D in said slot, or reverse position. Upon the next depression of the lever 15, the crank 31, which with the stem 19 in position D in slot 20, will be in its first position or that shown in the drawings, will move rearwardly carrying said stem to position A or low speed. Said stem in this movement, will be prevented from being thrust to the right into the portion E as said stem passes the latter portion through tension of the spring 36, by a stop shoulder 27″ formed in the slot 27 in plate 23, as shown in Fig. 8. Upon the next depression of lever 15, said stem will be carried forwardly by the plate 23, and as the same reaches the slot portion E, will be thrust through the latter by the tension of the spring 36 acting upon the plate 22 in the same manner as said spring operated in carrying said stem through the slot portion E in the opposite direction, as before described, it being clear, that during the rotation of the shafts 34 and 35 after the stem 19 had reached position D in slot 20, the spring 36 was placed in tension and this tension was gradually increased until the recoiling of said spring to force said stem toward the right through the slot portion E. When the stem 19 has passed entirely through the slot portion E, in this movement of said stem, the latter will be moved forwardly by the plate 23 to the initial or first position of said stem or at the position B in the slot 20. When the stem 19 is in position E, the gears controlled thereby will be in neutral position, and so that, in the gear shifting operation, if it is desired to shift the gears to neutral position, the lever 15, after stem 19 has been placed in either position A or C, in slot 20, is partially depressed so that said stem will be retained in the slot portion E and not forced entirely through the same as is the case when the lever 15 is completely depressed.

With the arrangement set forth then, it will be seen that the gear shifting stem 19 is successively moved to its gear shifting positions by successive depressions of the lever 15, the shifting of the gears to any particular condition, that is low, second, high, or reverse, being effected by depressing the lever 15 the proper number of times in order to progressively shift said gears to the desired condition.

By reason of the lost motion of the rod 46 in the forward movement thereof from normal position, as before described, upon depression of the lever 15, the clutch member 13 will be moved to inoperative or disengaging position before the member 43 is actuated, and hence before the gear shifting operation takes place. Secured to the shaft 35 adjacent the gear 40 is a disk 51 having diametric notches 52 in the periphery thereof. Projecting laterally from the rod 46 is a stud 53 adapted normally, to register with and enter one of the notches 52. The arrangement is such, however, that in the event of the lever 15 being only partly or incompletely depressed in an attempted gear shifting operation, the disk 51 will not be rotated to effect registration of one of the notches 52 thereof with the stud 53, and so that, upon the return movement of the rod 46, the stud 53 will contact with the periphery of the disk 51 and prevent the rod 46 returning fully to its normal rearward position and consequently resulting in the clutch member 13 being prevented from being moved forwardly to its operative position in engagement with clutch member 12. Thus with this arrangement, it will be seen, that a safety mechanism is provided which will prevent the clutch being thrown in except when the transmission gears are fully shifted, obviating the possibility of stripping of the teeth of the gears such as often results from connecting the engine, that is throwing in the clutch when the transmission gears are not fully shifted.

Arranged at the front end of the vehicle, where the same may be readily seen by the driver, is a rotatable indicator or hand 54 which is operatively connected by a train of shafts and gears 55 with the shaft 34, as clearly shown in Fig. 5. Coöperating with the indicator 54 is a graduated disk 56 whereby the different positions of the stem 19, or the different conditions of the transmission gears will be indicated, the indicator 54 moving simultaneously with the shafts 34 and 35 in the gear shifting operation, as will be readily understood.

With a construction as set forth it will be seen, that the usual hand operated lever now generally in use for effecting gear shifting will be eliminated, and a mechanism provided for performing this function which may be readily and easily operated by simple foot pressure. The construction is such, as will be seen, that the gear shifting takes place upon the depression of the lever 15, the return of said lever, which is effected by the spring 14 being inoperative, it being clear that in the return movement of said lever, the member 43 moving rearwardly, will rotate the gear 40 in a direction in which the same is disconnected from the shaft 35 by reason of the pawl and ratchet mechanism 41—42.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In a gear shifting mechanism, the combination with the actuating stem of a system of transmission gears, of means for operatively moving said stem, said means comprising a pair of members engaging with said stem, said members being mounted for movement relatively to each other; and means for moving said members, substantially as described.

2. In a gear shifting mechanism, the combination with the actuating stem of a system of transmission gears, of means for operatively moving said stem, said means comprising a pair of members having slots therein for engagement with said stem, said members being mounted for movement relatively to each other; and means for moving said members, substantially as described.

3. In a gear shifting mechanism, the combination with the actuating stem of a system of transmission gears, of means for operatively moving said stem, said means comprising two superimposed plates having slots therein through which said stem projects, said plates being mounted for shifting movement relatively to each other; and means for moving said plates, substantially as described.

4. In a gear shifting mechanism, the combination with the actuating stem of a system of transmission gears, of means for guiding the outer end of said stem in its operative gear shifting movement; a pair of members engaging with said stem for moving the same in said guiding means, said members being mounted for movement relatively to each other; and means for moving said members, substantially as described.

5. In a gear shifting mechanism, the combination with the actuating stem of a system of transmission gears, of means for guiding the outer end of said stem in its operative gear shifting movement; a pair of members engaging with said stem for moving the same in said guiding means successively to its various positions of gear shifting, said members being mounted for movement relatively to each other; and means for moving said members, substantially as described.

6. A gear shifting mechanism comprising in combination with the actuating stem of a system of transmission gears, of means for guiding said stem in its gear shifting movement, said means comprising a plate having an irregular slot therein through which said stem projects; and means engaging with said stem for moving the same successively to its various positions of gear shifting in said slot, substantially as described.

7. A gear shifting mechanism comprising in combination with the actuating stem of a system of transmission gears, of means for guiding said stem in its operative gear shifting movement, said means comprising a plate having an irregular slot therein through which said stem projects; and means engaging with said stem for moving the same successively to its various positions of gear shifting in said slot, said stem moving means comprising a pair of slotted members engaging with said stem, said members being mounted for movement relatively to each other in different directions in substantially parallel planes, substantially as described.

8. A gear shifting mechanism comprising in combination with the actuating stem of a system of transmission gears, of means for guiding said stem in its operative gear shifting movement, said means comprising a plate having an irregular slot therein through which said stem projects; and means engaging with said stem for moving the same successively to its various positions of gear shifting in said slot, said stem moving means comprising a pair of superimposed plates having slots therein through which said stem projects, said plates being slidably mounted for movement relatively to each other in planes extending substantially perpendicular to said stem, substantially as described.

9. A gear shifting mechanism comprising in combination with the actuating stem of a system of transmission gears, of means for guiding said stem in its operative gear shifting movement, said means comprising a plate having an irregular slot therein through which said stem projects; and means engaging with said stem for moving the same successively to its various positions of gear shifting in said slot, said stem moving means comprising a pair of superimposed plates having slots therein through which said stem projects, said plates being mounted for relative sliding movement at substantially right angles to each other in planes extending substantially perpendicular to said stem, substantially as described.

10. A gear shifting mechanism comprising in combination with the actuating stem of a system of transmission gears, of means for guiding said stem in its operative gear shifting movement, said means comprising a plate having an irregular slot therein through which said stem projects; and means engaging with said stem for moving the same successively to its various positions of gear shifting in said slot, said stem moving means comprising a pair of superimposed plates having elongated slots therein through which said stem projects, said plates being slidably mounted for movement relatively to each other in planes extending substantially perpendicular to said stem, the movement of said plates being in directions extending at substantially right angles to each other, and the slots in said plates being disposed at substantially right angles to each other, substantially as described.

11. In a gear shifting mechanism, the combination with the actuating stem of a system of transmission gears, of means for guiding said stem in its operative gear shifting movement; means for moving said stem in said guiding means successively to its various positions of gear shifting, said last mentioned means comprising a pair of relatively movable members having slots therein engaging with said stem; and resilient manually operable means for moving said members, substantially as described.

12. In a gear shifting mechanism, the combination with the actuating stem of a system of transmission gears, of means for operating said stem in its operative gear shifting movement; means for moving said stem in said guiding means successively to its various positions of gear shifting, said last mentioned means comprising a pair of relatively movable members having slots therein through which said stem projects; rotatable elements for moving said members; means for rotating said elements; and yielding connections between said last mentioned means and said rotatable elements, substantially as described.

13. In a gear shifting mechanism, the combination with the actuating stem of a system of transmission gears, of means for operating said stem in its operative gear shifting movement; means for moving said stem in said guiding means successively to its various positions of gear shifting, said last mentioned means comprising a pair of relatively movable members having slots therein through which said stem projects; rotatable elements for moving said members; means for rotating said elements; and torsional springs connecting said last mentioned means and said rotatable elements, substantially as described.

14. In a gear shifting mechanism, the combination with the actuating stem of a system of transmission gears, of means for guiding said stem in its operative gear shifting movement; means for moving said stem in said guiding means successively to its various positions of gear shifting, said last mentioned means comprising a pair of relatively movable members having slots therein engaging with said stem; rotatable crank shafts for moving said members; rotatable means for rotating said crank shafts; and yielding connections between said last mentioned means and said crank shafts, substantially as described.

15. In a gear shifting mechanism, the combination with the actuating stem of a system of transmission gears, of means for guiding said stem in its operative gear shifting movement; means for moving said stem in said guiding means successively to its various positions of gear shifting, said last mentioned means comprising a pair of relatively movable members having slots therein engaging with said stem; rotatable crank shafts for moving said members; rotatable means for rotating said crank shafts; and torsional springs connecting said last mentioned means and said crank shafts, substantially as described.

16. In a gear shifting mechanism, the combination with the actuating stem of a system of transmission gears, of means for guiding said stem in its operative gear shifting movement; means for moving said stem in said guiding means successively to its various positions of gear shifting, said last mentioned means comprising a pair of relatively movable members having openings therein engaging with said stem; rotatable crank shafts for moving said members; rotatable shafts arranged coaxial with said crank shafts for rotating the latter; and yielding connections between adjacent ends of said crank shafts, and operating shafts, substantially as described.

17. In a gear shifting mechanism, the combination with the actuating stem of a system of transmission gears, of means for guiding said stem in its operative gear shifting movement; means for moving said stem in said guiding means successively to its various positions of gear shifting, said last mentioned means comprising a pair of relatively movable members having openings therein engaging with said stem; rotatable crank shafts for moving said members; rotatable shafts arranged coaxial with said crank shafts for rotating the latter; and torsional springs connecting adjacent ends of said crank shafts and operating shafts, substantially as described.

18. In a gear shifting mechanism, the combination with the actuating stem of a system of transmission gears, of means for guiding said stem in its operative gear shifting movement; means for moving said stem in said guiding means successively to its various positions of gear shifting, said last mentioned means comprising a pair of relatively movable members having openings therein engaging with said stem; rotatable crank shafts for moving said members; rotatable shafts arranged coaxial with said crank shafts for rotating the latter; yielding connections between adjacent ends of said crank shafts and operating shafts; and a positive connection between the opposite ends of said operating shafts, substantially as described.

19. In a gear shifting mechanism, the combination with the actuating stem of a system of transmission gears, of means for guiding said stem in its operative gear shifting movement; means for moving said stem in said guiding means successively to its various positions of gear shifting, said last mentioned means comprising a pair of relatively movable members having openings therein engaging with said stem; rotatable crank shafts for moving said members; rotatable shafts arranged coaxial with said crank shafts for rotating the latter; torsional springs connecting adjacent ends of said crank shafts and operating shafts; and a positive connection between the opposite ends of said operating shafts, substantially as described.

20. In a gear shifting mechanism, the combination with the actuating stem of a system of transmission gears, of means for guiding said stem in its operative gear shifting movement; means for moving said stem in said guiding means to its various positions of gear shifting, said last mentioned means comprising a pair of members movable relatively to each other and in different directions, said members having openings therein engaging with said stem; rotatable crank shafts for moving said members; rotatable shafts arranged coaxial with said crank shafts for rotating the latter; yielding connections between adjacent ends of said crank shafts and operating shafts; and a gear connection between the opposite ends of said operating shafts, substantially as described.

21. In a gear shifting mechanism, the combination with the actuating stem of a system of transmission gears, of means for guiding said stem in its operative gear shifting movement; means for moving said stem in said guiding means to its various positions of gear shifting, said last mentioned means comprising a pair of members movable relatively to each other and in different directions, said members having openings therein engaging with said stem; yieldable means for moving said members; and manually operable means for actuating said last mentioned means, substantially as described.

22. In a gear shifting mechanism, the combination with the actuating stem of a system of transmission gears, of means for guiding said stem in its operative gear shifting movement; means for moving said stem in said guiding means to its various positions of gear shifting, said last mentioned means comprising a pair of members movable relatively to each other and in different directions, said members having openings therein engaging with said stem; yieldable means for moving said members; and a foot operable lever for actuating said last mentioned means, substantially as described.

23. In a gear shifting mechanism, the combination with the actuating stem of a system of transmission gears, of means for guiding said stem in its operative gear shifting movement; means for moving said stem in said guiding means to its various positions of gear shifting, said last mentioned means comprising a pair of members movable relatively to each other and in different directions, said members having openings therein engaging with said stem; yieldable means for moving said members; a manually operable lever; and a rack and gear mechanism coöperating with said lever and operatively connecting the same with said last mentioned means, substantially as described.

24. In a gear shifting mechanism, the combination with the actuating stem of a system of transmission gears, of means for guiding said stem in its operative gear shifting movement; means for moving said stem in said guiding means to its various positions of gear shifting, said last mentioned means comprising a pair of members movable relatively to each other and in different directions, said members having openings therein through which said stem projects; rotatable crank shafts for moving said members; rotatable elements for rotating said crank shafts; yielding connections between said rotatable elements and said crank shafts; and a manually operable lever for actuating said rotatable elements, substantially as described.

25. In a gear shifting mechanism, the combination with the actuating stem of a system of transmission gears, of means for guiding said stem in its operative gear shifting movement; means for moving said stem in said guiding means to its various positions of gear shifting, said last mentioned means comprising a pair of members movable relatively to each other and in different directions, said members having openings therein through which said stem projects; rotatable crank shafts for moving said members; rotatable elements for rotating said crank shafts; yielding connections between said rotatable elements and said crank shafts; and a rack and gear mechanism coöperating with said lever whereby said rotatable elements will be intermittently actuated upon operation of said lever, substantially as described.

26. In a gear shifting mechanism, the combination with the actuating stem of a system of transmission gears, of means for guiding said stem in its operative gear shifting movement, said guiding means comprising a plate provided with an irregular slot through which said stem projects; means for moving said stem in said guiding slot to its various positions of gear shifting, said last mentioned means comprising a pair of superimposed plates arranged adjacent said guide plate and having slots therein through which said stem projects, said last mentioned plates being mounted for relative sliding movement in different directions in substantially parallel planes; rotatable crank shafts connected with said sliding plates for moving the same; rotatable shafts arranged coaxial with said crank shafts for rotating the latter; a yielding connection between said operating shafts and crank shafts; and manually operable means for rotating said operating shafts, substantially as described.

27. In a gear shifting mechanism, the combination with the actuating stem of a system of transmission gears, of means for guiding said stem in its operative gear shifting movement, said guiding means comprising a plate provided with an irregular slot through which said stem projects; means for moving said stem in said guiding slot to its various positions of gear shifting, said last mentioned means comprising a pair of superimposed plates arranged adjacent said guide plate and having slots therein through which said stem projects, said last mentioned plates being mounted for relative sliding movement in different directions in substantially parallel planes; rotatable crank shafts connected with said sliding plates for moving the same; rotatable shafts arranged coaxial with said crank shafts for rotating the latter; a yielding connection between said operating shafts and crank shafts; a gear connection between said operating shafts; manually operable means for rotating said operating shafts, said last mentioned means comprising a gear operatively connected with said operating shafts; and a manually operable rack meshing with said gear, substantially as described.

28. In a gear shifting mechanism, the combination with the actuating stem of a system of transmission gears, and a clutch comprising a movable clutch member, of means for operatively moving said stem; a lever for moving said movable clutch member into and out of operative position; an operative connection between said lever and said stem operating means, said connection comprising a rack operatively connected with said lever; and a gear meshing with said rack, substantially as described.

29. In a gear shifting mechanism, the combination with the actuating stem of a system of transmission gears, and a clutch comprising a movable clutch member, of means for operatively moving said stem; a lever for moving said movable clutch member into and out of operative position; an operative connection between said lever and said stem operating means, said connection comprising a rack operatively connected with said lever; a gear meshing with said rack, said stem being moved to its various positions of gear shifting by depression of said lever; and means for preventing movement of said movable clutch member to operative position when said gear has not been fully actuated in the operative depression of said lever, substantially as described.

30. In a gear shifting mechanism, the combination with the actuating stem of a system of transmission gears, and a clutch comprising a movable clutch member, of means for operatively moving said stem; a lever for moving said movable clutch member into and out of operative position; an operative connection between said lever and said stem operating means, said connection comprising a rack operatively connected with said lever; a gear meshing with said rack, said stem being moved to its various positions of gear shifting by depression of said lever; a disk having spaced notches in its periphery, said disk being arranged for movement simultaneously with said gear; and a pin adapted to register with and enter said notches when said gear is fully actuated in the operative depression of said lever, said pin being adapted, when said gear has not been fully actuated in the operative depression of said lever, to engage against the periphery of said disk and prevent movement of said movable clutch member to operative position, substantially as described.

31. In a gear shifting mechanism, the combination with the actuating stem of a system of transmission gears, of means for guiding said stem in its operative gear shifting movement, said means comprising a plate having a substantially H-shaped slot through which said stem projects; means for guiding said stem in its operative gear shifting movement in said slot, said last-mentioned means comprising a pair of superimposed members having openings therein through which said stem projects, said members being mounted for relative sliding movement in directions at substantially right angles to each other and in substantially parallel planes, substantially as described.

32. In a gear shifting mechanism, the combination with the actuating stem of a system of transmission gears, of means for guiding said stem in its operative gear shifting movement, said means comprising a plate having a substantially H-shaped slot through which said stem projects; means for guiding said stem in its operative gear shifting movement, said last mentioned means comprising a pair of superimposed plates, each of said plates having a slot through which said stem projects, said slots being elongated in directions at substantially right angles to each other, said plates being mounted for relative sliding movement in directions at substantially right angles to each other and in substantially parallel planes, substantially as described.

33. In a gear shifting mechanism, the combination with the actuating stem of a system of transmission gears, of means for guiding said stem in its operative gear shifting movement, said means comprising a plate having a substantially H-shaped slot through which said stem projects; means for guiding said stem in its operative gear shifting movement, said last mentioned means comprising a pair of superimposed plates, each of said plates having a slot through which said stem projects, said slots being elongated in directions at substantially right angles to each other, said plates being mounted for relative sliding movement in directions at substantially right angles to each other and in substantially parallel planes; and a stop shoulder provided in one of the longitudinal edges of one of said slots for engagement with said stem, substantially as described.

34. In a gear shifting mechanism, the combination with the actuating stem of a system of transmission gears, of means for guiding said stem in its operative gear shifting movement, said means comprising a plate having a substantially H-shaped slot through which said stem projects; means for guiding said stem in its operative gear shifting movement, said last mentioned means comprising a pair of superimposed plates, each of said plates having a slot through which said stem projects, said slots being elongated in directions at substantially right angles to each other, said plates being mounted for relative sliding movement in directions at substantially right angles to each other and in substantially parallel planes; and a stop shoulder provided in one of the longitudinal edges of one of said slots at each extremity thereof for engagement with said stem, substantially as described.

35. In a gear shifting mechanism, the combination with the actuating stem of a system of transmission gears, of means for operatively moving said stem, said means comprising a pair of members engaging with said stem, said members being mounted for movement relatively to each other; means for moving said members; and an indicator operatively connected with said stem operating means for indicating the various positions of gear shifting of said stem, substantially as described.

36. In a gear shifting mechanism, the combination with the actuating stem of a system of transmission gears, of means for guiding said stem in its operative gear shifting movement; means for moving said stem in said guiding means to its various positions of gear shifting, said last mentioned means comprising a pair of members movable relatively to each other and in different directions, said members having openings therein engaging with said stem; rotatable crank shafts for moving said members; rotatable shafts arranged coaxial with said crank shafts for rotating the latter; yielding connections between adjacent ends of said crank shafts and operating shafts; a gear connection between the opposite ends of said operating shafts; and an indicator operatively connected with one of said operating shafts for indicating the various positions of gear shifting of said stem, substantially as described.

In testimony whereof I have signed my name to this specification in the presence of two subscribing witnesses.

STEWART K. MONTGOMERY.

Witnesses:
Louis J. Koerner,
James E. Brady.